Patented June 22, 1937

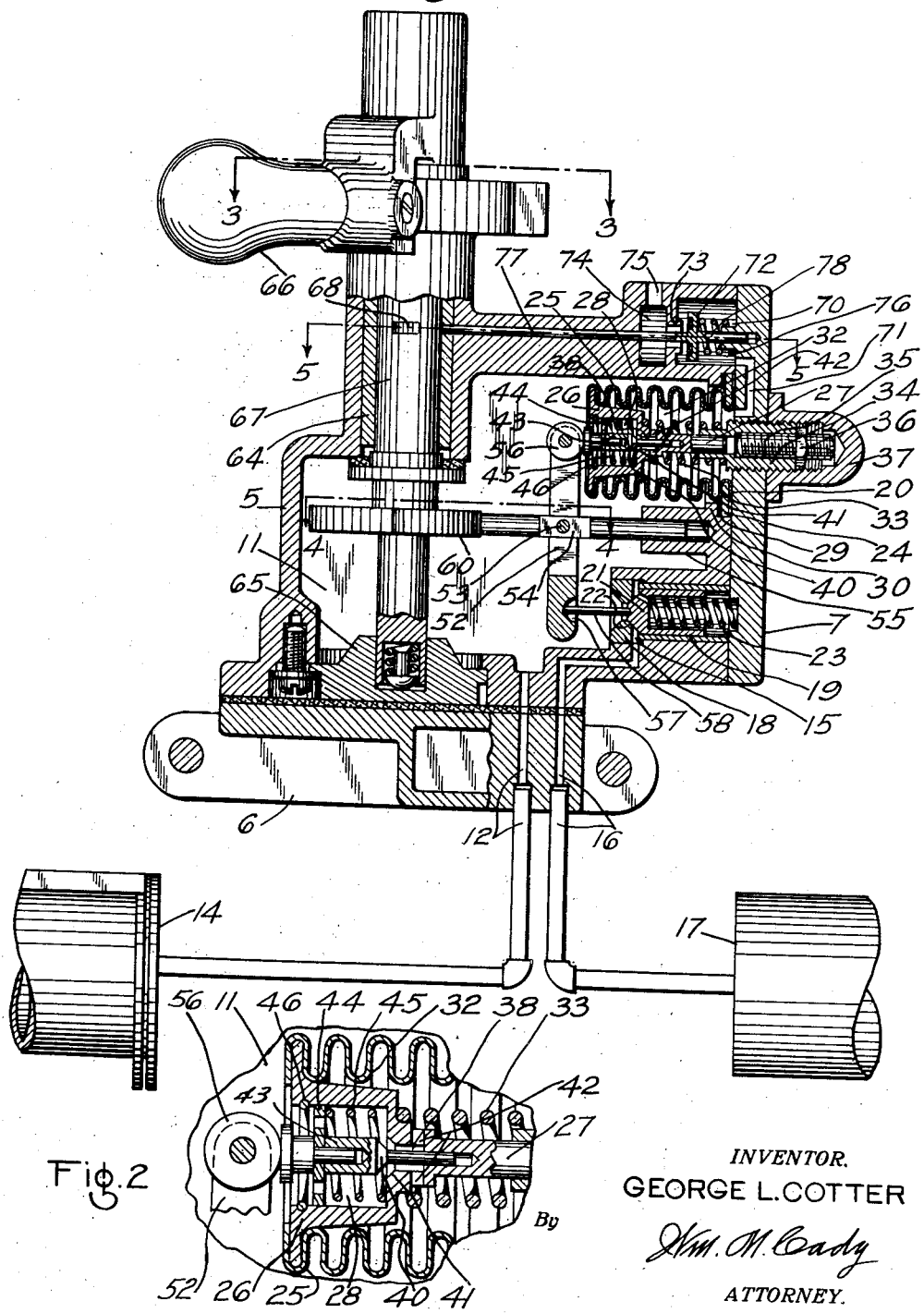

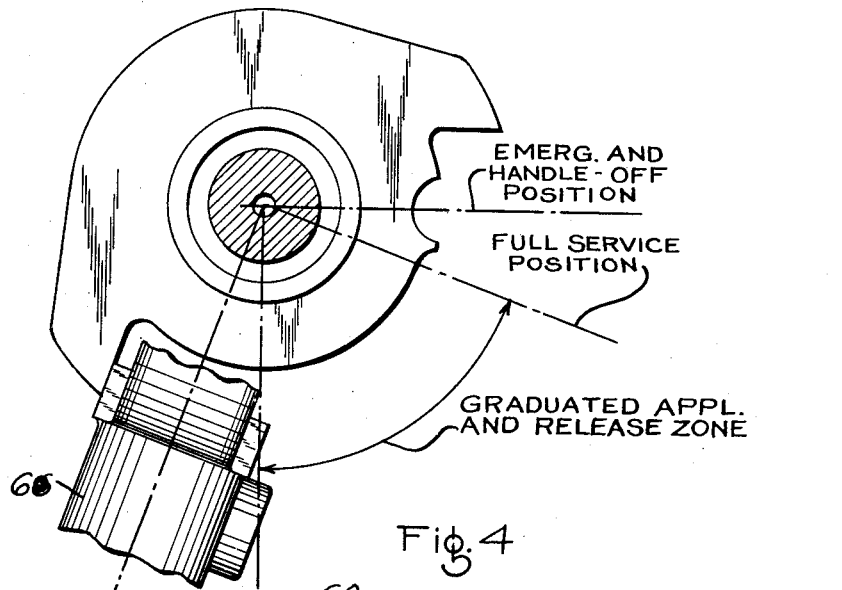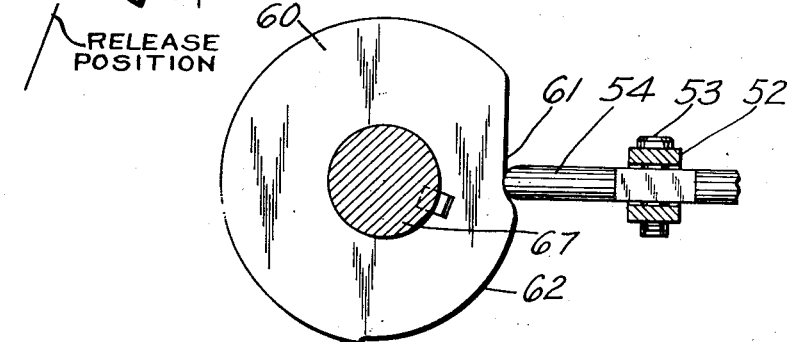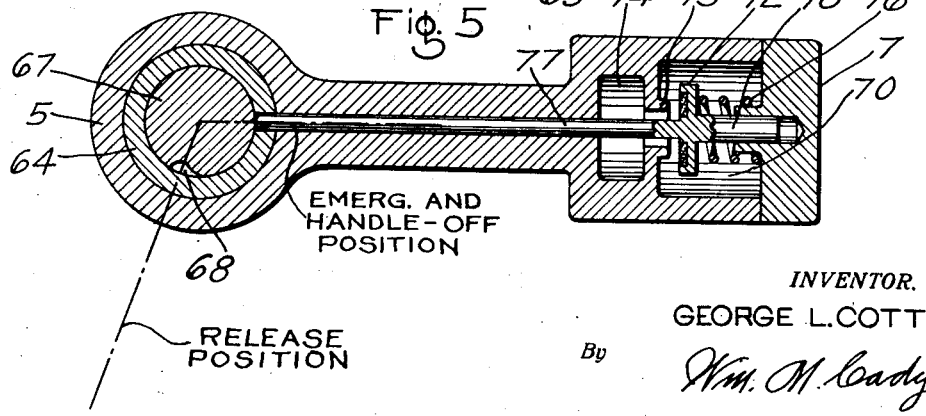

2,084,669

UNITED STATES PATENT OFFICE 2,084,669

SELF LAPPING BRAKE VALVE

George L. Cotter, Wilkinsburg, Pa., assignor to The Westinghouse Air Brake Company, Wilmerding Pa., a corporation of Pennsylvania Application February 15, 1935, Serial No. 6,673

3 Claims. (Cl. 303—54)

This invention relates to control valve devices for fluid pressure brakes, and more particularly to self-lapping brake valve devices of the type disclosed in the patent to Ewing K. Lynn and Rankin J. Bush No. 2,042,112.

It is desirable to employ a diaphragm of the bellows or sylphon type instead of a piston for regulating the supply and release of fluid under pressure to the brake cylinder, but there is danger that the diaphragm may become damaged, so that leakage will occur from the brake cylinder to the atmosphere.

The principal object of my invention is to provide a self-lapping brake valve device employing a flexible diaphragm of the bellows or sylphon type and means for preventing loss of fluid under pressure in case the diaphragm becomes damaged.

In the accompanying drawings, Fig. 1 is a detailed view mainly in section of a brake valve device embodying my invention, one form of brake equipment to which the device is applicable being shown diagrammatically; Fig. 2 is an enlarged detail sectional view of a portion of the sylphon diaphragm and exhaust valve mechanism; Fig. 3 is an enlarged detail sectional view taken on the line 3—3 of Fig. 1; Fig. 4 is an enlarged detail sectional view taken on the line 4—4 of Fig. 1; and Fig. 5 is an enlarged detail sectional view taken on the line 5—5 of Fig. 1.

As shown in the drawings, the brake valve device comprises a casing having a main section 5, mounted on a pipe bracket 6, and a cover plate 7 for closing the open end of the section 5. The casing has a pressure chamber 11 connected through a passage and pipe 12 to a brake cylinder 14.

The main section 5 of the casing is provided with a valve chamber 15 in constant communication through a passage and pipe 16 with a main reservoir 17, and separated from the pressure chamber 11 by a seat disc 18. Slidably mounted in a bushing 19 secured in a bore adjacent the chamber 15 is a supply valve 21, which is adapted to engage a seat 22 on seat disc 18 for controlling communication from chamber 15 to chamber 11. A spring 23 is provided between valve 21 and cover plate 7 for urging said valve into engagement with the seat 22.

Disposed in chamber 11 is a movable abutment which may be in the form of a sylphon or bellows diaphragm 25, having a flange 20 at one end clamped to the cover plate 7 by means of an annular washer 24. A gasket 29 is interposed between the washer 24 and a shoulder 30 formed on casing section 5 for preventing leakage of fluid under pressure past the diaphragm 25. The opposite end of the bellows diaphragm 25 has secured thereto, preferably by solder, an exhaust valve mechanism extending back into said diaphragm and comprising a hollow sleeve member 26, which is provided with a stem portion 27 and forms at one side a chamber 28 open to chamber 11 and at the opposite side a chamber 32 within the bellows diaphragm.

A metering spring in the form of the coil spring 33 contained in chamber 32 is interposed between and engages the sleeve member 26 and an adjusting member 34 which has screwthreaded connection with the cover plate 7. This adjusting member is provided with a central bore tapped to receive a screw-threaded stop member 35, which is adapted to be adjusted relative to the member 34 and is fitted with a lock nut 36 for locking it in the desired position. A cap nut 37 is provided, having screw-threaded connection with the outer end of adjusting member 34 for locking said member in its adjusted position.

Contained in the chamber 28 of the sleeve member 26 is an exhaust or release valve 40, which is adapted to seat on a valve seat 41 carried by said sleeve member and is operative to control communication from the chamber 11 to the chamber 32 within the bellows diaphragm by way of a bore 38 and passages 42 in the stem portion 27. The exhaust valve 40 is provided with a stem 43 extending into chamber 11, and to which is secured a pierced collar 44 having a slidable engagement with the wall of chamber 28 in the sleeve member, while a spring 45 is interposed between said collar and the inner end of the sleeve member 26 for urging said valve away from the seat 41. The collar 44 is adapted to engage a stop ring 46, fitted into an interior annular groove in the sleeve member, for limiting outward movement of the exhaust valve 40 and stem 43.

For controlling the operation of the supply and exhaust valves 21 and 40 respectively, a mechanism is provided, comprising a lever 52 which is pivotally connected intermediate its ends, by means of a pin 53, to a plunger 54, one end of which is slidably mounted in a suitable bore in a guide portion 55 of casing section 5. The lever 52 carries at one end a roller 56 which is operatively aligned with and engages the outer end of the stem 43 of the exhaust valve 40, and has at the opposite end a depression 57 adapted operatively to receive the end of a stem 58 secured to supply valve 21.

A cam 60 is provided in the chamber 11, having peripheral cam faces 61, 62, and 63, as is best shown in Fig. 4 of the drawings, and which are adapted operatively to engage the free end of the plunger 54, said cam being keyed to a control shaft 67, which is rotatably mounted in a bushing 64, and in a bearing member 65 which is secured to the casing section 5. The operating shaft 67 and cam 60 may be rotated through the medium of the usual removable handle 66.

According to the invention, an auxiliary valve device is provided, comprising a valve 72 having a guide stem 78 and contained in a valve chamber 70 formed in casing section 5, which is connected by way of a passage 71 in the cover plate 7 to the chamber 32 within bellows diaphragm 25. The valve 72 is adapted to seat on a seat rib 73 formed on a partition wall separating chambers 70 and 74 for controlling communication between said chambers, while a spring 76 is disposed in chamber 70 between the valve and cover plate 7 and urges said valve toward said seat rib.

The valve 72 is carried by an operating plunger 77 which extends through the opening within the seat rib 73 and through chamber 74 and is slidably mounted in a suitable bore in casing section 5. The free end of plunger 77 is in operative engagement with the control shaft 67, which has in a portion of its peripheral surface a depressed area 68, so positioned that it may be rotated into alignment with said free end of the plunger 77 upon movement of the brake valve handle into emergency position. It will be noted that the operating plunger is of such a length that it normally holds the valve 72 unseated.

With the brake valve handle 66 in release position, as shown in Figs. 1 and 3, the shaft 67 and cam 60 are also in release position as shown in Fig. 4. In this position, the free end of the plunger 54 is in light contact with or in close proximity to the cam face 61, so that there being no inward pressure exerted on the plunger 54, the pressure of spring 23 maintains the supply valve 21 seated and the pressure of spring 45 maintains the exhaust valve 40 unseated. Since in release position the operating plunger 77 of the auxiliary valve device bears upon the periphery of the shaft 67, it holds the valve 72 unseated.

With the exhaust valve 40 and valve 72 unseated, the brake cylinder 14 is open to the atmosphere through pipe and passage 12, chamber 11, chamber 28 in the sleeve member 26, past valve 40, through passages 42 in the stem 27, chamber 32, passage 71, chamber 70, past valve 72, and through chamber 74 and passage 75.

It should be understood that the compression value of spring 23 is greater than that of spring 45, while the compression value of spring 33 is greater than the combined compression values of springs 23 and 45.

In operation, when it is desired to apply the brakes, the handle 66 is moved to rotate the shaft 67 and cam 60, so that the cam face 62 is brought into operating engagement with the plunger 54, thereby forcing said plunger and the pivotally connected lever 52 toward the right hand. This initial movement of the lever 52 causes it to turn in a clockwise direction about the point of contact at its lower end with stem 58 as a fulcrum, since spring 23 offers greater resistance to inward movement than does spring 45 and the roller 56 acts against the valve stem 43 to compress the spring 45 and move said stem so as to cause the exhaust valve 40 to seat, thus closing the atmospheric communication from chamber 11 and consequently from the brake cylinder 14. The exhaust valve 40 is seated just before the handle 66 reaches the beginning of the graduated application and release zone as defined by the cam face 62.

With the exhaust valve 40 seated the pressure of spring 33, being greater than that of both springs 45 and 23, will hold the valve mechanism carried by the bellows diaphragm 25 substantially stationary, and upon further movement of the handle 66 and cam 60 into the graduated application and release zone, the plunger 54 is operated so as to turn the lever 52 in a counter-clockwise direction, thereby causing the supply valve 21 to be unseated against the pressure of spring 23. Fluid under pressure is then supplied from the main reservoir 17 through pipe and passage 16 to chamber 15, and past the unseated valve 21, to chamber 11, and thence through passage and pipe 12 to the brake cylinder 14, thus effecting an application of the brakes.

It will be noted that during this operation of the brake valve handle 66, the operating stem 77 of the auxiliary valve device remains in contact with the peripheral surface of shaft 67, thus maintaining valve 72 unseated.

When the pressure of fluid in the chamber 11 acting upon the bellows diaphragm 25 has built up to a degree sufficient to overcome the opposing force of the spring 33, the bellows will be partially collapsed, thereby moving the sleeve member 26 toward the right-hand. At the same time, the pressure of spring 23 causes the supply valve 21 to move toward its seat 22, and through the medium of said valve and stem 58, turns lever 52 about pin 53 as a fulcrum, thereby causing the roller 56 to maintain the exhaust valve 40 seated. When the flow of fluid under pressure to chamber 11 is thus closed off, the bellows diaphragm 25 is held by the pressure of spring 33 against further movement, and the brake valve device is thus operated to lap the supply valve while the exhaust valve remains closed.

If it is desired to reduce brake cylinder pressure to effect a partial release of the brakes, the handle 66 is moved in a clockwise direction and the cam 60 thus permits movement of plunger 54 to the left, operating the lever 52 so as to permit the spring 45 to unseat the exhaust valve 40, the valve 40 as it unseats turning the said lever in a counter-clockwise direction about its contact point with the stem 58 of supply valve 21, which is held seated by spring 23. Fluid under pressure is then vented from the brake cylinder 14 by way of pipe and passage 12, chamber 11, past exhaust valve 40, through passages 42, chamber 32, passage 71, chamber 70, past valve 72, and through chamber 74 and passage 75 to atmosphere. Upon the consequent reduction of fluid pressure in chamber 11, the spring 33 acts to move the bellows diaphragm 25 and sleeve member 26 toward the left-hand until valve seat 41 is brought into engagement with the exhaust valve 40 which is positioned by the cam mechanism, whereupon further movement stops, the communication from chamber 11 to atmosphere having been closed and the reduction of fluid pressure in the brake cylinder and chamber 11 checked.

To effect a full release of the brakes, the brake valve handle 66 is moved to release position, in which position the cam mechanism acts to permit spring 45 to unseat the exhaust valve 40, causing fluid under pressure in the brake cylinder 14 and in chamber 11 to vent to atmosphere as before described. Since, in this position, movement of valve 40 is not limited by the cam mechanism, spring 45 acts to maintain said valve spaced from its seat 41 while the bellows diaphragm and sleeve member are moved to release position, thus permitting complete release of fluid from the brake cylinder, and causing the parts to move to release position as shown in the drawing.

When it is desired to effect an emergency application of the brakes, the handle 66 is operated to rotate the shaft 67 and the cam 60 to emergency and handle off position. In this position, the cam face 63 of cam 60 is turned into engagement with the plunger 54, which is thereby moved to the extreme right-hand position, so that exhaust valve 40 is closed and supply valve 21 is moved farther from its seat than in service position. As the fluid pressure in chamber 11 increases due to flow of fluid from the main reservoir 17, the bellows diaphragm 25 may be moved inwardly until the stem 27 engages stop member 34, while the exhaust valve 40 is held seated by pressure of the spring 23 transmitted to said valve through the medium of supply valve 21, stem 58, lever 52, roller 56 and stem 43. Since the supply valve 21 is maintained unseated, the pressure of fluid in the main reservoir 17 is permitted to equalize into the brake cylinder 14, thus insuring a high brake cylinder pressure in emergency application of the brakes.

In emergency position, the depression 68 in the shaft 67 registers with the operating stem 77 of the auxiliary valve device, permitting the stem to be shifted toward the left, so that the valve 72 is moved by the spring 76 into seating engagement with seat rib 73. The atmospheric communication from the chamber 32 within the bellows diaphragm 25 thus having been closed, the possibility of undesired leakage of fluid under pressure from chamber 11 and consequently from the brake cylinder 14 as a result of failure of the bellows or other parts of the valve mechanism, is averted, and the brakes will remain applied.

To release the brakes following an emergency application, the shaft 67 and cam 60 are rotated, through the medium of the handle 66, in a clockwise direction, and as the cam face 62 initially registers with the plunger 54, the spring 23 acting through the medium of the supply valve 21, stem 58, and lever 52, causes the plunger to move inwardly and follow the contour of the cam face, permitting the supply valve 21 to seat and close communication from the main reservoir to the chamber 11. At the same time, movement of shaft 67 causes the operating stem 77 to be shifted out of the depressed area 68 so that valve 72 is thereby unseated and chamber 70 and connected chamber 32 are opened to atmosphere. Now as the handle 66 is moved to release position the several parts of the brake valve device will operate in the same manner as hereinbefore described to effect the complete release of the brakes.

It will thus be seen that should the bellows diaphragm become damaged or other parts of the valve mechanism fail, so as to permit loss of fluid under pressure from the pressure chamber of the brake valve device and the connected brake cylinder to the atmosphere, such loss of fluid may be prevented by moving the brake valve handle to emergency position, in which the auxiliary valve 72 is seated, so as to close the communication through which one side of the diaphragm is normally vented to atmosphere.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a fluid pressure brake, in combination, a self-lapping brake valve device comprising a casing having a chamber, a flexible bellows diaphragm subject to the pressure of said chamber, a rotatable cam shaft, a cam mechanism operated by said cam shaft, and valve means controlled by said diaphragm and said cam mechanism for supplying fluid under pressure to and releasing fluid under pressure from the chamber; and an auxiliary valve assembly comprising a spring, a valve subject to the pressure of said spring and adapted to be operated to prevent discharge of fluid under pressure from the chamber by way of the diaphragm, and an operating stem connected to said valve for normally maintaining it unseated, and adapted upon rotation of the cam shaft to engage a depression in the periphery of said shaft for causing operation of said valve.

2. In a fluid pressure brake, in combination, a self-lapping brake valve device comprising, in combination, a casing having a chamber, a movable abutment subject to the pressure of the fluid in said chamber, rotatable cam means, and valve means controlled by said abutment and said cam means for supplying fluid under pressure to and releasing fluid under pressure from said chamber, and an auxiliary valve assembly comprising a spring, a valve subject to the pressure of said spring and adapted to be operated to prevent discharge of fluid under pressure from the chamber by way of the movable abutment, and an operative stem associated with said valve for normally maintaining said valve unseated and adapted upon rotation of the cam means to permit seating of said valve.

3. In a fluid pressure brake, in combination, a self-lapping brake valve device comprising, in combination, a casing having a chamber, a flexible diaphragm subject to the pressure of the fluid in said chamber, rotatable cam means, and valve means controlled by said diaphragm and said cam means for supplying fluid under pressure to and releasing fluid under pressure from said chamber, and emergency means comprising an auxiliary valve adapted to be operated to prevent discharge of fluid under pressure from the chamber by way of the diaphragm, and a stem for operating said valve upon rotation of said cam means.

GEORGE L. COTTER.